(12) United States Patent
Hermann

(10) Patent No.: US 7,672,001 B2
(45) Date of Patent: Mar. 2, 2010

(54) DEVICE AND PROCESS FOR QUANTITATIVE ASSESSMENT OF THE THREE-DIMENSIONAL POSITION OF TWO MACHINE PARTS, SHAFTS, SPINDLES, WORKPIECES OR OTHER ARTICLES RELATIVE TO ONE ANOTHER

(75) Inventor: Michael Hermann, Villingen (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 174 days.

(21) Appl. No.: 11/741,078

(22) Filed: Apr. 27, 2007

(65) Prior Publication Data
US 2007/0253002 A1 Nov. 1, 2007

(30) Foreign Application Priority Data

Apr. 28, 2006 (DE) .................. 10 2006 020 358
May 17, 2006 (DE) .................. 10 2006 023 408
May 19, 2006 (DE) .................. 10 2006 023 926

(51) Int. Cl.
*G01B 11/14* (2006.01)

(52) U.S. Cl. ....................... 356/614; 356/615

(58) Field of Classification Search ...... 356/138–139.1, 356/141.1–141.5, 153–154, 399–401, 128, 356/601–624; 73/800; 33/547, 546
See application file for complete search history.

(56) References Cited

U.S. PATENT DOCUMENTS 3,739,176 A 6/1973 Thorn

| | | |
|---|---|---|
| 4,518,855 A | 5/1985 | Malak |
| 4,794,736 A | 1/1989 | Fuwa et al. |
| 4,866,553 A | 9/1989 | Kubo et al. |
| 6,592,430 B1 | 7/2003 | Nakasuji et al. |
| 7,130,034 B2 | 10/2006 | Barvosa-Carter et al. |
| 7,312,862 B2 | 12/2007 | Zumbrunn et al. |
| 2004/0174542 A1 | 9/2004 | Handman et al. |

FOREIGN PATENT DOCUMENTS

| | | |
|---|---|---|
| DE | 290 783 A7 | 6/1991 |
| DE | 200 02 150 U1 | 6/2001 |
| DE | 101 17 390 A1 | 10/2002 |

*Primary Examiner*—Gregory J Toatley, Jr.
*Assistant Examiner*—Tri T Ton
(74) *Attorney, Agent, or Firm*—David S. Safran; Roberts Mlotkowski Safran & Cole, P.C.

(57) ABSTRACT

An apparatus and a method that can be used for qualitative or quantitative determination of the three-dimensional location of two bodies relative to one another which can be used, for example, to determine the mutual position of two bodies according to angular or translational coordinates. Furthermore, the apparatus and method can be used in a measurement robot or in a coordinate measurement device. The device composed of a device for emitting a light beam which is fanned in several planes and at least three, preferably four or more, optoelectronic line sensors or linear sensors for determination of the incidence points of the light beam which has been flared in several planes on the line sensors or an upstream target surface.

17 Claims, 7 Drawing Sheets

DEVICE AND PROCESS FOR QUANTITATIVE ASSESSMENT OF THE THREE-DIMENSIONAL POSITION OF TWO MACHINE PARTS, SHAFTS, SPINDLES, WORKPIECES OR OTHER ARTICLES RELATIVE TO ONE ANOTHER

BACKGROUND OF THE INVENTION

1. Field of the Invention

The invention relates to a process and devices for quantitative assessment of the three-dimensional positioning and orientation of two machines or machine parts relative to one another, such as, for example, shafts, machine tool spindles, workpieces or other physical articles. The invention is likewise suited to quantitatively measuring or assessing the alignment of two cylindrical objects which are to be aligned to one another, for example, pipes or pipelines. Furthermore, the device is suited to use as a sensor in a coordinate measurement device or a measurement robot. Moreover, the invention is suited for use as a measurement means in ranging tasks in building construction and underground construction, especially in tunnel building.

2. Description of Related Art

Processes and devices of a similar type have been successfully used for several years in the assessment of the three-dimensional positioning and orientation of two machines or machine parts relative to one another and have been characterized in that an enormous amount of work time has been saved by their use.

A corresponding generic device is known from German Patent Application DE 101 17 390 in which reference is made as to the nature of prior art. In this document, it is described how the flush position of two machine parts can be checked, measured and assessed using a beam-generating light source.

The known devices and processes often call for precision parts and components, partially also expensive optical components, and in this way, enable precise and reliable measurements.

SUMMARY OF THE INVENTION

A primary object of the present invention is to improve the known processes and devices on the hardware side such that the precision of such a device can be further improved, with a simultaneously significant enlargement of its measurement range, both in the lateral (with respect to distance) and also transverse (crosswise) dimension. Thus, a device in accordance with the invention is able to be used in applications in which previous measurement systems have already encountered the limits of what is technically feasible with respect to resolution, linearity or size of the measurement range.

With the device in accordance with the invention, the following can be checked and quantitatively measured:
  translational offset between two articles to be measured in up to two directions of space, for example, horizontally and vertically
  angular offset between two articles to be measured according to up to three angular coordinates in space, for example, azimuth, elevation and roll angle.

Therefore, the device can be used very easily in a metrological coordinate measurement device according to German Utility Model DE 200 02 150, for example.

To achieve the aforementioned object, the following are provided:
  a means which emits a repeatedly fanned light beam, especially a double-flat laser light beam so that the cross section of the emitted light beam has the shape of a crosshair, a star or a generalized, irregular shape of a cross or a star.
  at least two, preferably at least three or more, linear optoelectronic sensor arrays or position-sensitive diodes (PSDs) for direct or indirect determination of the incidence points of the light beam which has been flared in two or more planes.

The pertinent measurement process in accordance with the invention calls for use of the measurement device in accordance with the invention in one or more steps.

The use of the measurement process in accordance with the invention or the measurement device in accordance with the invention is advantageous not only for measuring the displacement of machine parts such as shafts or pipes, but can also be carried out advantageously in metrological devices, such as measurement robots or coordinate measurement machines.

To produce a repeatedly fanned light beam which has thus been flared in, for example, two or more planes, there is preferably a diffraction grating, for example, in the form of a point grating. Alternatively, instead, there can be a hologram or a microlens array. The diffraction grating, the hologram or the microlens array are preferably transmissive (i.e., proportionally translucent) and are advantageously inserted into the beam path of a conventional laser. Thus, they produce the desired beam cross sectional shape. However, the indicated optical elements can also be inserted into the beam path of a laser such that their reflective properties take effect and are used.

In accordance with the invention, a conventional optoelectronic sensor which can be read out two-dimensionally is replaced by an arrangement of either three linear optoelectronic arrays (arranged on the side lines of a triangle to one another) in CCD or CMOS technology, or an arrangement of preferably four, optionally, other such linear arrays (also called sensor lines or line sensors).

Compared to the prior art, this arrangement has the following significant advantages:
  enlargement of the measurement range for determining the laser incidence point or its equivalent to more than 35 mm, compared to the previously typically roughly 10-20 mm
  increase of the optical resolution to 1:100 000 or more compared to previously roughly 1:10 000 (when using averaging processes)
  color discrimination, thus more extensive possibility of suppressing outside light
  improved, i.e., extremely high precision, linearity of the sensor
  possibility of detection of an additional rotary angle coordinate (i.e., roll angle)
  very high light sensitivity
  very high-speed preparation of digitized measurement data possible
  intensive illuminance can be made available by using laser light sources of up to 5 mW or more for noncoherent or multicolor light sources
  drastic cost reduction.

With this invention, the measurement results which have been obtained can be used in a following step and by means of the respective process to document the position and/or angular position of objects which have been erroneously aligned relative to one another either with great accuracy or to correct them with extremely high precision. The use of the invention as a measurement device in a coordinate measurement device or measurement robot is associated with great benefit since the displacement of test pieces, workpieces, etc. relative to a measurement table or the like can be measured and recorded with high precision. For the same reason, the use of the invention as a measurement device for ranging tasks in building construction or underground construction, especially in tunnel building, is advantageously possible.

It is beneficial in accordance with the invention if, in addition to the light- or laser light-generating device and the light receiving device, there are additional auxiliary devices, such as, for example, additional inclinometers, especially electronic inclinometers, or bubble levels which can be visually inspected.

The invention is explained in greater detail below with reference to the accompanying drawings.

DETAILED DESCRIPTION OF THE INVENTION

Figure 1:
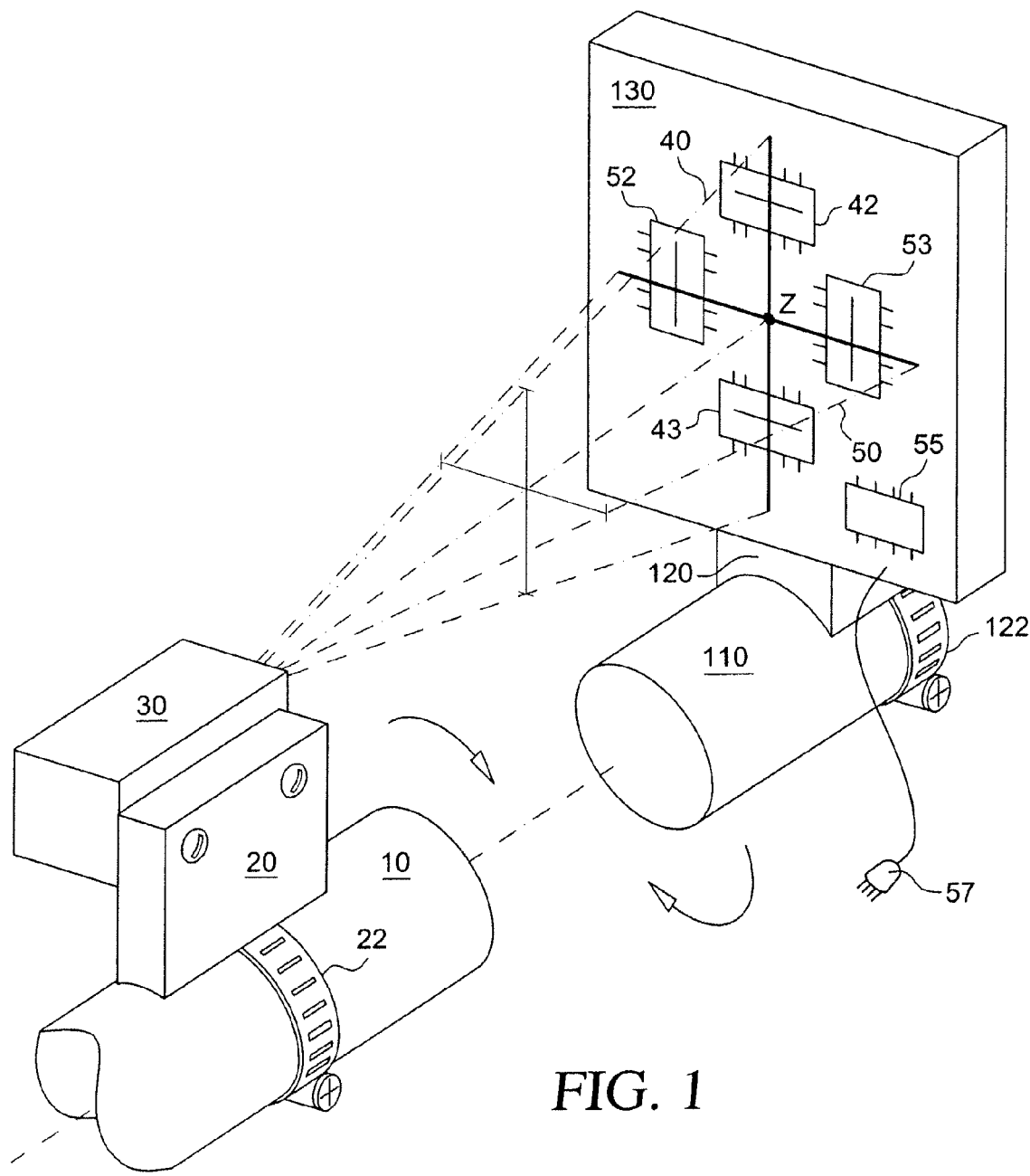
FIG. 1 is a schematic perspective side view of the device in accordance with the invention with a crosshair-shaped light- or laser beam-emitting unit and a light receiving unit which are mounted respectively on the shaft ends

As shown schematically in FIG. 1, a metrological system in accordance with the invention can be accommodated in two separate housings 30, 130. There are holding or clamping devices 22, 122 so that application to the shaft ends 10, 110 of machines is possible in the known manner.

Within the housing 30, there is a device for producing two laser light planes which are oriented forward and which are preferably oriented at right angles to one another. As already mentioned, this special laser light can be produced by means of diffraction gratings, a hologram or a microlens arrangement.

Therefore, the device which is connected to the housing 130 represents a receiving device especially for an incident laser beam or light beam with an essentially crosshair-shaped cross section. The receiving elements are line sensors (linear arrays) or position sensitive detectors (PSDs) 42, 43, 52 and 53 which are located roughly on the sides of a square. The origin of the coordinate system can be placed in the center of the square. The electronic interconnection and read-out of these optoelectronic modules, which are supplied as line sensors, for example, of a type available from Sony, can be performed in a conventional manner, for example, by a higher order computer (not shown). The device 130 is superior in many respects in its electro-optical properties as compared to a conventional rectangular electro-optical sensor which is designed to detect the incidence site of a simple laser beam. This relates especially to the size of the measurement range, the sensitivity and the linearity.

As is shown in FIG. 1, instead of recording the incidence point of a single laser beam (with the cross section of a circle of roughly 1 to 5 mm diameter) at a location Z on a position-sensitive diode (PSD) or a flat pixel-oriented CMOS or CCD image sensor, the crosshair-shaped layer beam is now used in an innovative manner in interplay with a plurality, i.e., at least two, but preferably three or four line sensors to precisely define the incidence center Z. It is apparent that the cross section of the crosshair-shaped light beam or laser beam is defined preferably by lines at least 20 mm long. The effective coordinates of the incidence center of the crosshair-shaped light or laser beam are computed therefore by averaging, specifically, using the abscissa values delivered by the line sensors 42, 43 which are illuminated by the laser beam, and as an average of the ordinate values delivered by the line sensors 52, 53 which have been illuminated by the light beam.

Figure 2:
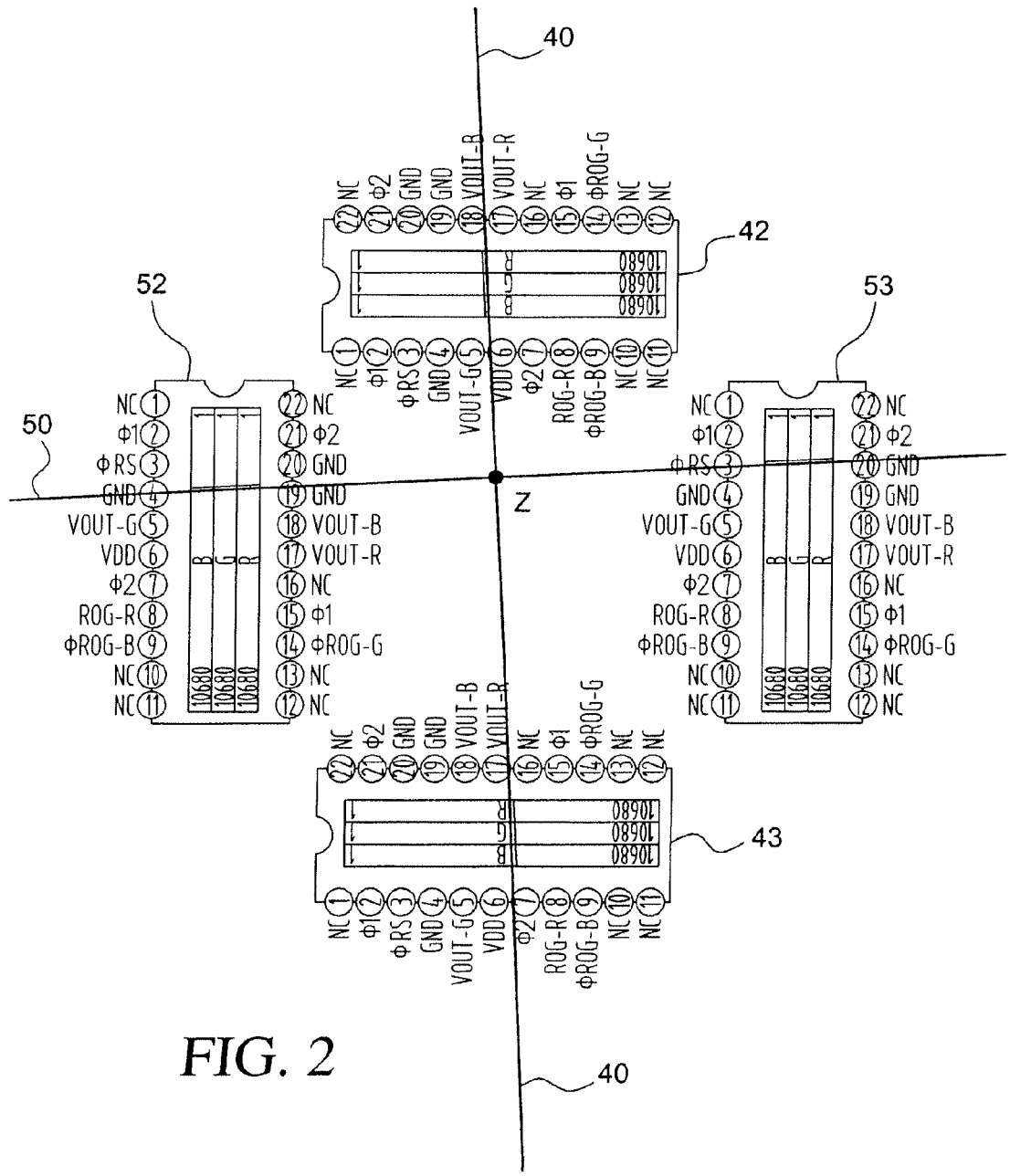
FIG. 2 is a schematic plan view showing the manner of action of the light-receiving unit with four line sensors (alternatively PSDs)

In contrast to the prior art with position-sensing diodes (PSD) which can be read out two-dimensionally, the rotational location of the light beam (roll angle) can be conveniently determined relative to the receiving device 130, as is shown symbolically in FIG. 2. The device which exists in the housing 130 can, in principle, be optionally supplemented by its own light transmitter or laser transmitter which emits light in the vicinity of the center Z. This combined device can be used, based on the known prior art, in pairs for the intended measurement projects, to further increase the accuracy and to detect not only the parallel offset, but also the angular offset between the articles to be measured. This device with an additional light or laser transmitter can also be used individually when it works in conjunction with a reflector which is opposite it in the direction of the light beam which is to be emitted. This reflector can be either a flat mirror or can be a reflecting prism.

FIG. 2 shows how the proportional plane 40 of the light beam or laser beam is incident on the line sensors 42, 43 and can be recorded there according to color, intensity and incidence location by means of conventional methods (downstream electronic evaluation circuits or computers, not shown, see plug-in device 57 in FIG. 1). Furthermore, it is shown how the proportional plane 50 of the light beam or laser beam is incident on the line sensors 52, 53 and can be recorded there according to color, intensity and incidence location. The indicated commercial pixel-oriented line sensors have a resolution of better than 3*10000 pixels for a pixel grating constant of roughly 3 microns. For devices with low operating quality, of course, line sensors with a smaller pixel number can also be provided. If necessary, there can be linear PSDs instead. The center Z of interest is computed, as mentioned, from the averages of the acquired abscissa and ordinate values of the incident light beam of crosshair-shaped cross section, i.e., which values are delivered from the line sensors or PSDs.

The transmitters and receivers can also be mounted on the shaft ends 10, 110, such that the light or laser beam 40, 50 is emitted essentially axially parallel to the shaft end 10. The torsion or rolling range of interest for the indicated shaft ends is then computed from the difference values of the abscissa values of the measurement results delivered from the line sensors or the corresponding ordinate values and the distance of the line sensors from a center which is common to them. This torsion or roll angle can be determined relatively accurately for the indicated dimensioning (on the order of magnitude of roughly 5 microrad).

According to another configuration of the invention, by means of a ground glass screen on which the light beam with a crosshair-shaped cross section is incident, and projecting optics which projects the image of the ground glass screen onto the line sensors, indirect imaging of the light beam can be undertaken. In this way, it is possible to either enlarge the desired measurement range (for example, to 300-500 mm) or optionally to reduce its size (for example, to 5-10 mm).

Figure 3:
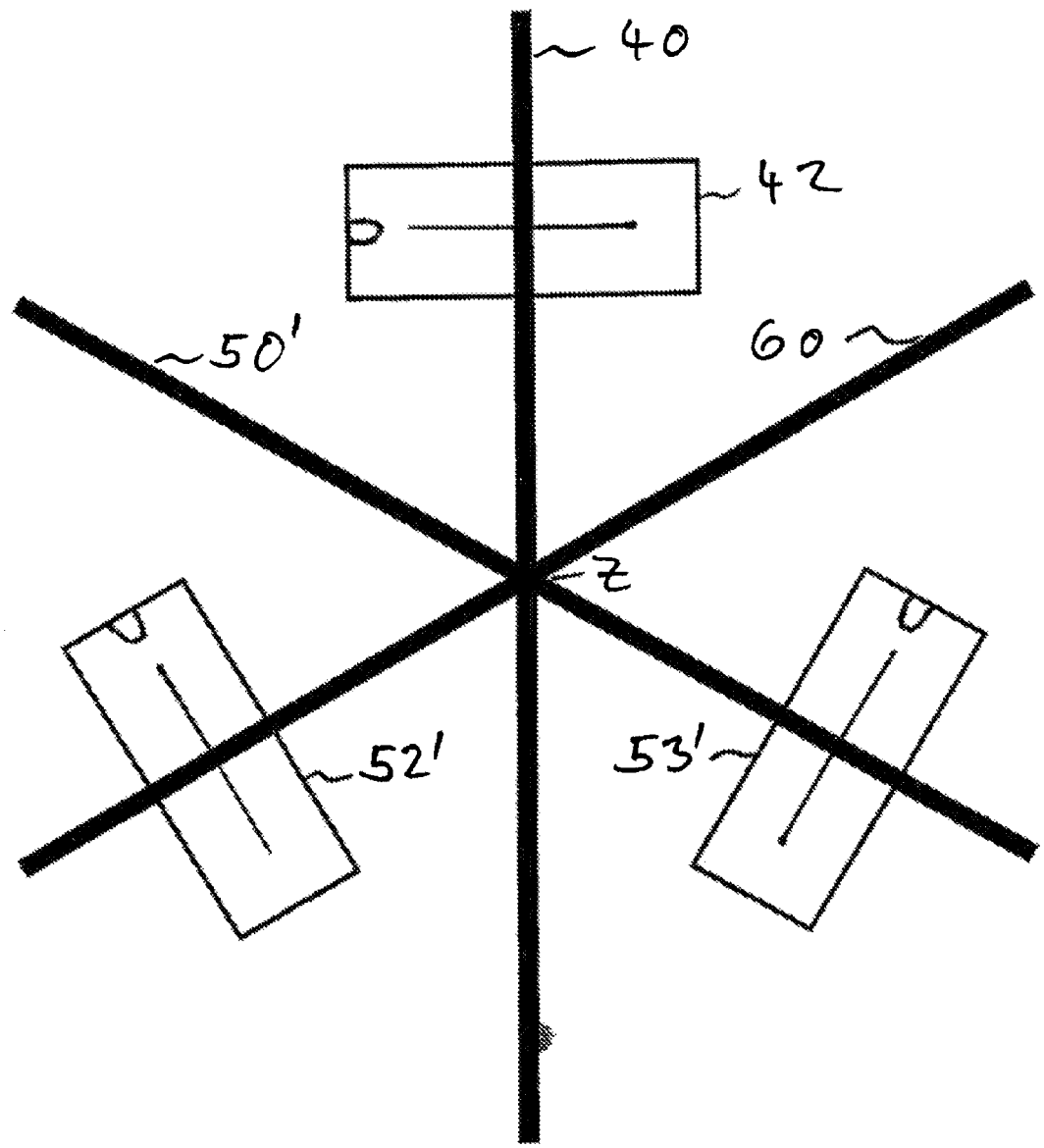
FIG. 3 is a schematic plan view of the manner of action of the light-receiving unit with three line sensors or PSDs

To reduce costs, according to the invention and as shown in FIG. 3, it is also possible to provide only 3 line sensors which are arranged in a circle. In this way, then, a specially flared light beam which is characterized by three individual planes 40, 50', 60 is incident on them. These planes thus have an angle of, for example, 60° relative to one another. The location of the center Z of this flared light beam relative to a center of symmetry formed by the line sensors is computed likewise using known methods of geometry and algebra. As soon as the flared light beam illuminates only the center elements of the line sensors, if there is no additional angular offset, correct alignment between the articles to be measured can be deduced.

Figure 4:
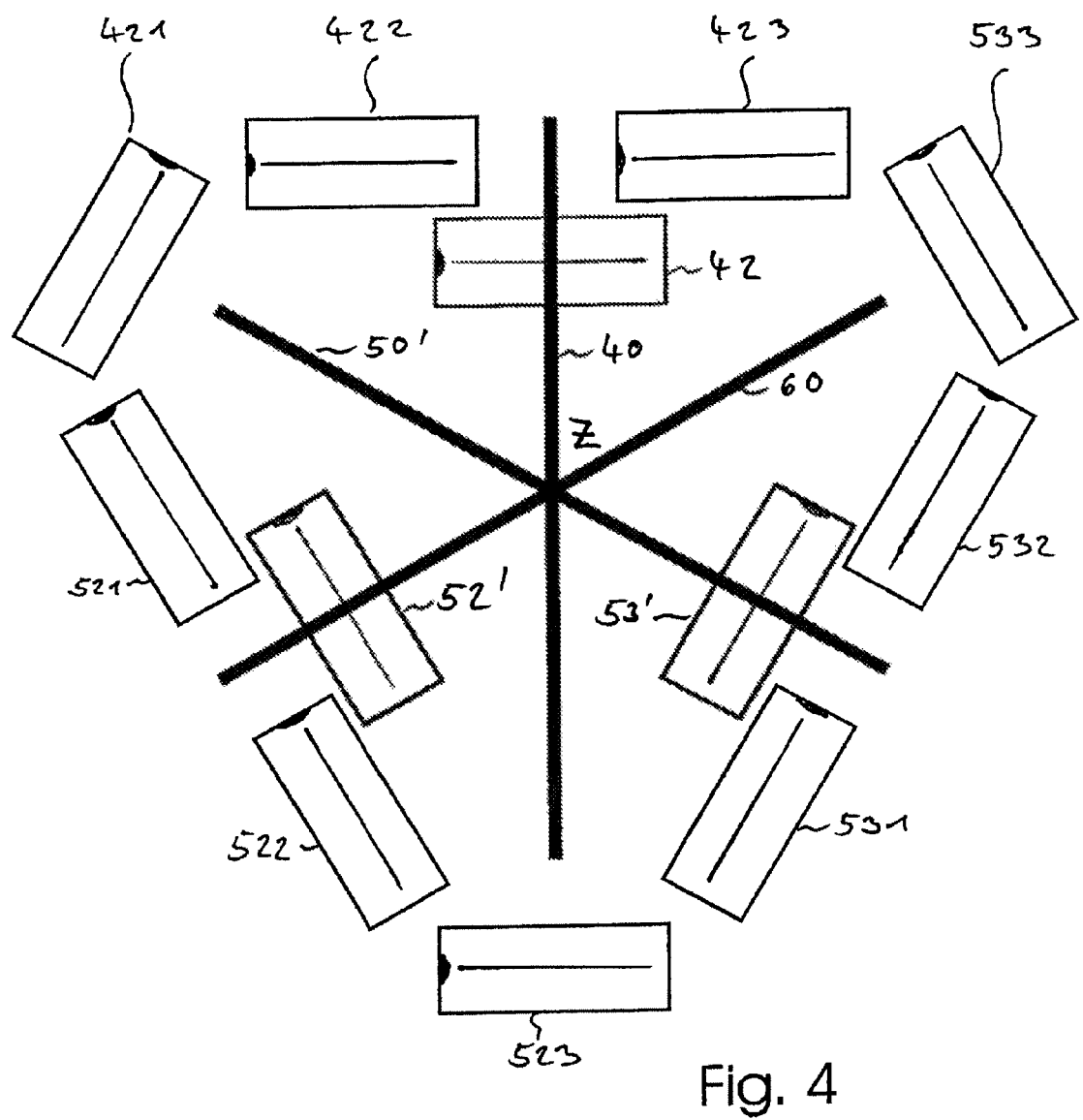
FIG. 4 is a diagram of one configuration of the invention with a host of line sensors or PSDs with an effective receiving region which is enlarged by the overlapping arrangement

As shown in FIG. 4, the measurement region of the arrangement as shown in FIG. 3 can be enlarged without optical means. As shown, in addition to the line sensors 42, 52', 53', there are other line sensors 422, 423; 521, 522; 531, 532 which are arranged parallel to them. Therefore, these additional line sensors are located in a radially outer region. The illustrated overlapping arrangement of the line sensors makes possible a measurement range which is again greatly elongated compared to the prior art. Effective measurement areas of 100 mm×100 mm and more can be obtained. If major displacement or twisting of the light beam combination comprised of light beams 40, 50', 60 relative to the line sensors can be expected, as illustrated, other line sensors 421, 523, 533 can be provided. In this way, an additionally enlarged measurement region is obtained.

Figure 5:
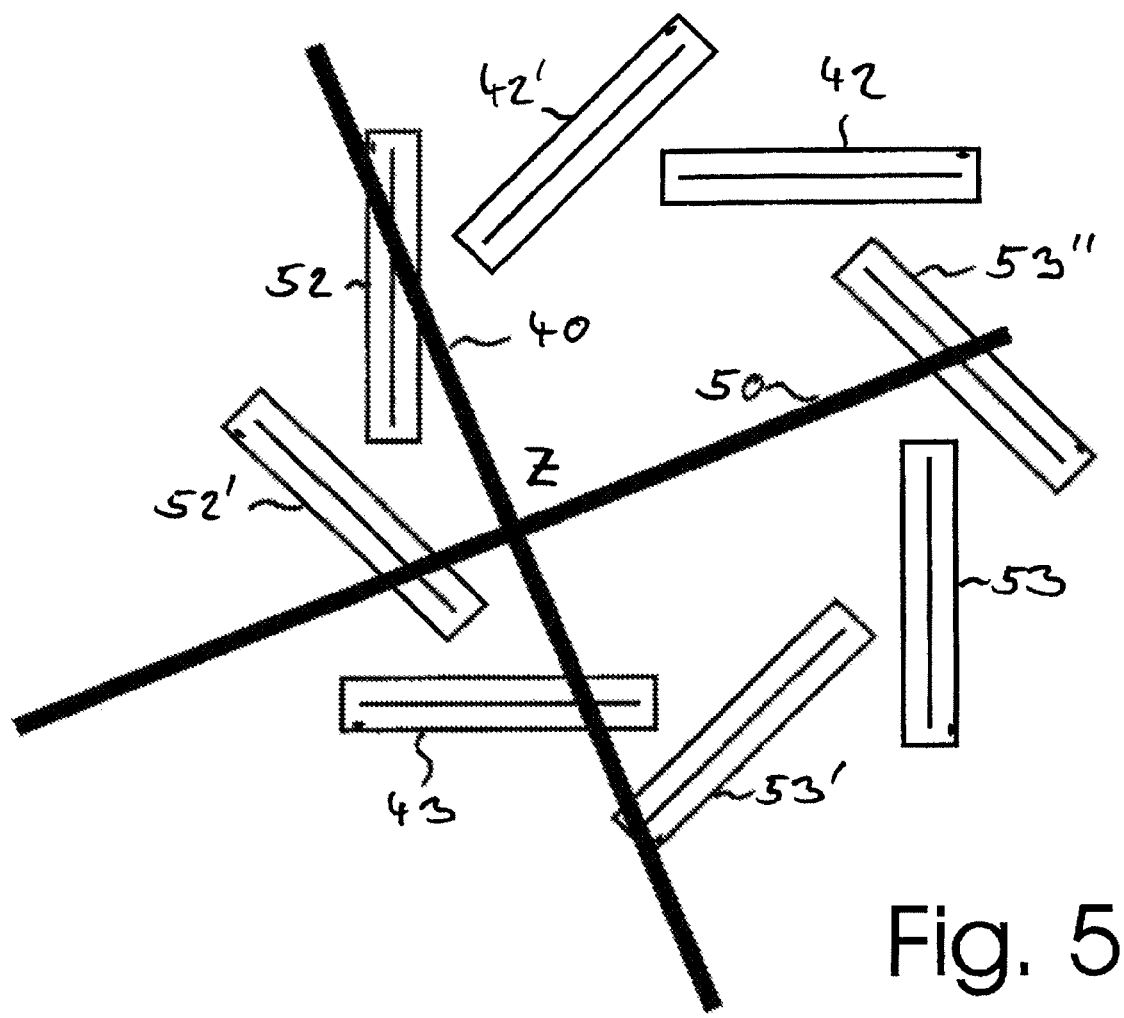
FIG. 5 is a diagram of another configuration of the invention with a host of line sensors or PSDs which are arranged roughly in a ring shape

As is shown in FIG. 5, a measurement region for detecting the location of a repeatedly flared light beam relative to a receiving device of fundamentally any size can be displayed by there being a host of line sensors (42, 42', 52, 52', 43, 53', 53, 53') in an annular, and optionally, also overlapping manner on a suitable measurement surface. It goes without saying that, in the approximate vicinity, a suitable protective housing with corresponding apertures for the illustrated line sensors is of use. As is shown schematically in FIG. 5 (therefore without electronics to be connected downstream of the line sensors 42 to 53), in such an arrangement or a comparable one, a very large measurement surface can be formed. With it, the position and/or the rotational location of a light beam which is displaced parallel and/or which is turned around its lengthwise axis with several proportional light surfaces or planes (40, 50) can be measured very precisely. For this purpose, as in the other described cases, the incidence site of the light beam on the exposed line sensors can also be determined electronically. Using these determined measurement data, then, it is possible with the aid of standard mathematical-geometrical methods to determine the location of the center Z of the light beam relative to a coordinate system which is assigned to one of the line sensors with high to extremely high precision.

Figure 6:
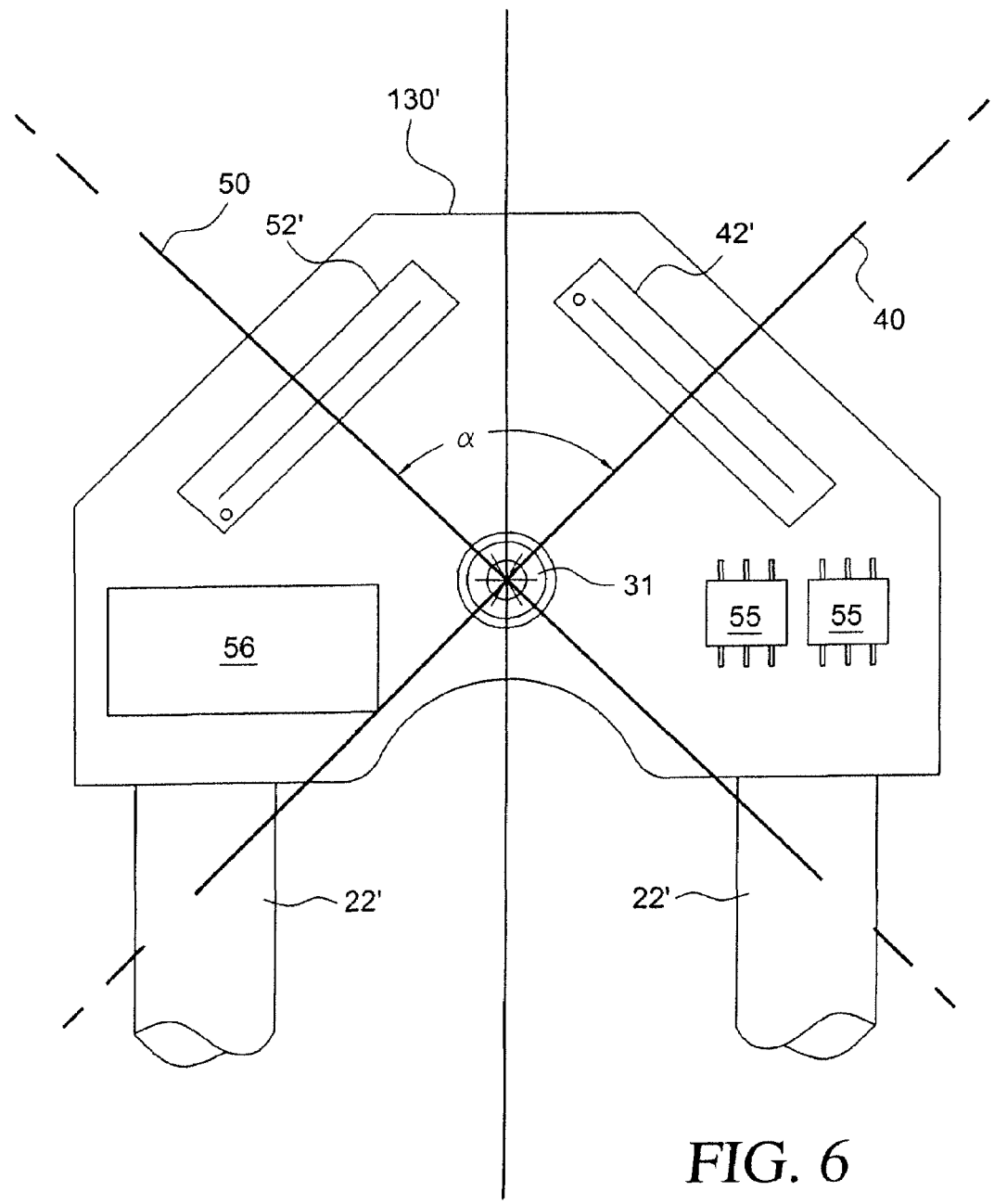
FIG. 6 is a schematic plan view of another configuration of the invention with only two linear optoelectronic sensors and a light or laser transmitter mounted in the vicinity for producing repeatedly flat light beams or laser beams

A still more economical embodiment of the invention with only two linear optoelectronic sensors is shown in FIG. 6. It does not operate as accurately as the remotely comparable means shown in FIGS. 1 & 2 since averaging cannot be carried out. Moreover, it is not directly possible to detect the torsion angle between the articles to be measured.

In addition to the line sensors or PSDs 42', 52' which are placed in or on a housing 130' such that their lengthwise directions are orthogonal to one another, there can optionally be a light or laser transmitter 31. As explained for the previous figures, in this case, it is also such that the two line sensors or PSDs are designed to detect the position of the incident points of a repeatedly flared light beam or laser beam on these sensors and to relay it as an electronic signal to a higher order electronics (55 or downstream electronics, not shown). The linear optoelectronic sensors 42', 52', the electronics, and optionally, the light transmitter or laser transmitters 31 can be supplied with a battery which is located in a battery housing 56. Optionally, there can be wireless data transmission (not shown) which enables data communication with external computers, electronics, portable telephones, and so-called PDA devices.

As is apparent, parallel displacement of the housing 130' relative to a repeatedly flat light beam or laser beam incident on it can be detected with the two sensors 42', 52'. In the illustrated case, the flat light beams or laser beams 40, 50 are orthogonal to one another, i.e., the surface normals assigned to them are perpendicular to one another. The embodiment shown in FIG. 6 (and also in FIG. 7) is suited for being operated in a paired combination, i.e., in interplay with an essentially completely identical, frontally opposite model of such a device. The holding devices 22' correspond to comparable mounting structures according to the prior art and are used to clamp the housing 130 on, for example, a shaft end (compare FIG. 1, reference numbers 10, 110, and 20, 120).

Figure 7:
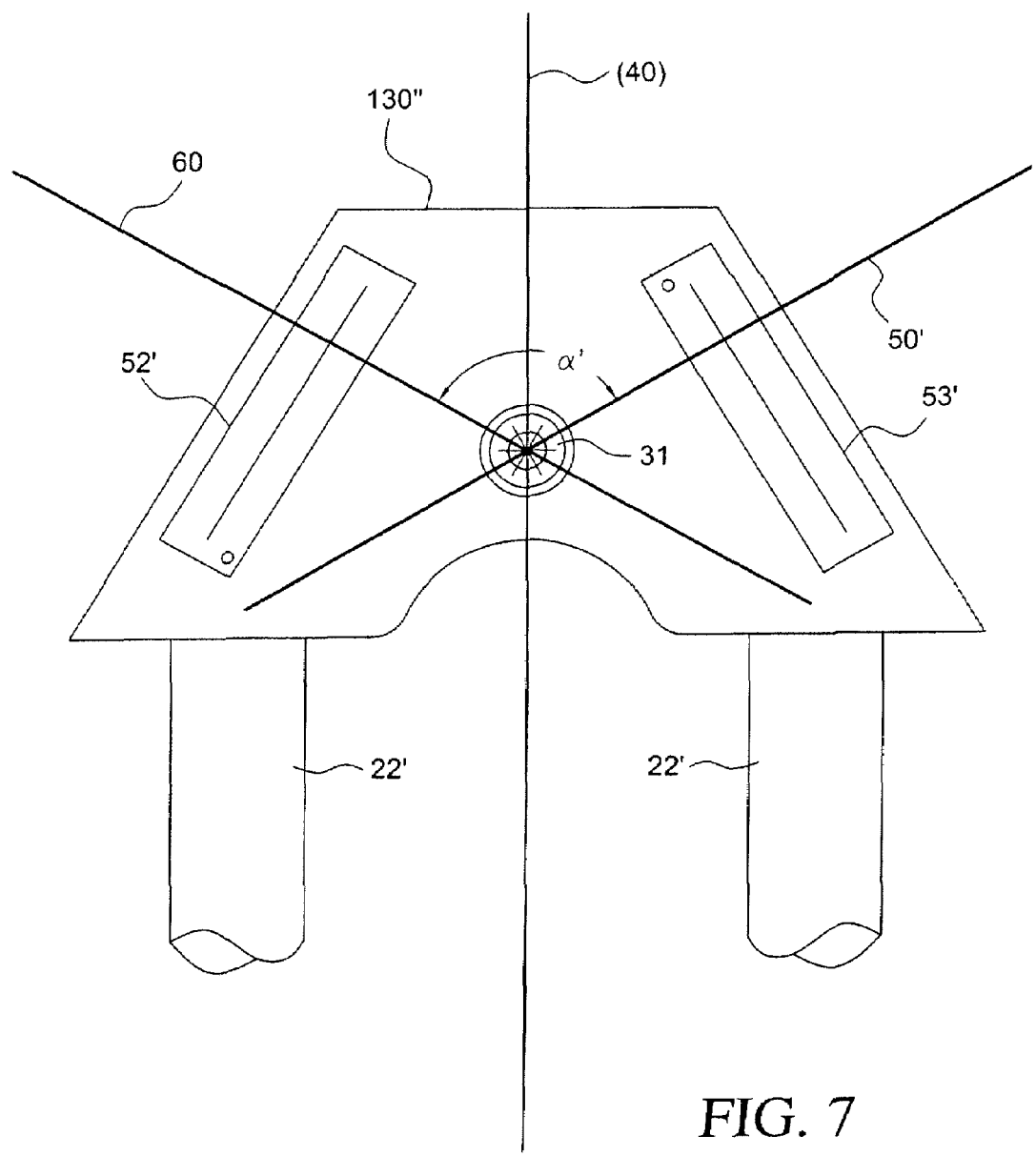
FIG. 7 is a schematic plan view, similar to FIG. 6, of another configuration with line sensors or PSDs aligned non-orthogonally to one another.

The further configuration of the invention as shown in FIG. 7, in contrast to FIGS. 3, 4 or 5, calls likewise for only two linearly optoelectronic sensors. In this case the lengthwise axes of the sensors 52' and 53' however are arranged for example at an angle of 60° to one another so that a more compact construction is enabled. Otherwise the manner of operation corresponds essentially to the one shown in FIG. 6. In any case the illustrated sensors 50', 52' are especially suited to receiving a light beam or laser beam which is composed of at least two individual surfaces 50', 60. The normals of these individual surfaces in the illustrated example, have an angle of 60° to one another so that the illustrated angle alpha assumes a value of 120°. There can optionally be an additional third light surface (40) if this seems advisable for reasons of production costs even if this light surface works only at extreme twist angles between the articles to be measured.

The embodiment as shown in FIG. 7 with its own optional light transmitter or laser sensor 31 is especially suited to acting in a paired combination with a second, identically acting device of this type. In this case, it is then provided that these identically acting devices are frontally opposite one another. In this way, the light transmitter or laser transmitter 31 of one device can alternately illuminate the opposing line sensors 50', 52'. In this way, analogous to the devices as shown in the prior art, both parallel offset (translational offset) and also an angular offset between the objects to be measured can be quantitatively detected according to the two pertinent coordinates.

Instead of the installation possibility provided as shown in FIGS. 6 & 7, for a housing 130', 130" on shafts, for example, other installation or clamping devices can be provided which are made, for example, such that the figure axis of the light or laser transmitter or transmitters roughly coincides with at least one axis of symmetry of the articles to be measured.

What is claimed is:

1. Device for qualitative or quantitative determination of the three-dimensional location of two bodies relative to one another, with respect to at least one of translational and angular coordinate systems, comprising:
a transmitting device which emits a light beam which is flared in at least two planes,
a receiving device with at least two linear optoelectronic sensors for determining incidence points of the light beam which has been flared in at least two planes on the indicated optoelectronic linear sensors, lengthwise axes of the optoelectronic linear sensors being non-orthogonally aligned with respect to each other,
wherein the optoelectronic linear sensors are arranged in an annular manner in which each optoelectronic linear sensor overlaps adjoining optoelectronic linear sensors with the overlapped sensors together producing a gap-free measurement range.

2. Device according to claim 1, wherein at least two linear optoelectronic sensors comprises at least three linear optoelectronic sensors.

3. Device according to claim 1, wherein at least two linear optoelectronic sensors comprises at least four linear optoelectronic sensors.

4. Process for qualitative or quantitative determination of the three-dimensional location of two bodies relative to one another in at least one of translational and angular coordinate systems, comprising the steps of:
mounting a transmitting device, which emits a light beam which is flared in at least two planes, the light beam having a crosshair-shaped or star-shaped cross section, on a first of the two bodies facing toward a second of the two bodies;
mounting one of a reflector and a receiving device on the second of the two bodies facing toward the first of the two bodies, the receiving device being mounted on the first of the two bodies if said one of the reflector and the receiving device is the reflector, and the receiving device having at least two linear optoelectronic sensors, lengthwise axes of the optoelectronic linear sensors being non-orthogonally aligned with respect to each other and arranged in an annular manner in which each optoelectronic linear sensor overlaps adjoining optoelectronic linear sensors with the overlapped sensors together producing a gap-free measurement range;
emitting a light beam which is flared in at least two planes and directing it toward the receiving device;
determining incidence points of the light beam which has been flared in at least two planes on the optoelectronic linear sensors; and
using the determination of the incidence points for qualitative or quantitative determination of the thee-dimensional location of two bodies relative to one another.

5. Device in accordance with claim 1, wherein the device is adapted for use in a measurement robot.

6. Process in accordance with claim 4, wherein the two bodies are machines or machine parts and wherein the using step is performed for aligning the machines or machine parts relative to one another.

7. Process in accordance with claim 4, wherein the two bodies are pipes of pipelines and wherein the using step is performed for aligning the pipes of pipelines relative to one another.

8. Process in accordance with claim 4, wherein the two bodies are tunnel sections and wherein the using step is performed for aligning the tunnel sections relative to one another for tunnel building.

9. Device in accordance with claim 1, wherein the transmitting device emits a light beam which is flared in at least three planes.

10. Device in accordance with claim 1, wherein lengthwise axes of the optoelectronic linear sensors enclose a polygonal shape that is free of right angled corners.

11. Device in accordance with claim 10, wherein the polygonal shape is essentially an equilateral triangle.

12. Apparatus for qualitative or quantitative determination of the three-dimensional location of two bodies relative to one another, with respect to at least one of translational and angular coordinate systems, comprising:
a transmitting device which emits a light beam which is flared in at least three intersecting planes,
a receiving device with at least two linear optoelectronic sensors for determining incidence points of the light beam which has been flared in at least two planes on the indicated optoelectronic linear sensor,
wherein the optoelectronic linear sensors are arranged in an annular manner in which each optoelectronic linear sensor overlaps adjoining optoelectronic linear sensors with the overlapped sensors together producing a gap-free measurement range.

13. Apparatus in accordance with claim 12, wherein only two linear optoelectronic sensors are provided in said receiving device.

14. Apparatus in accordance with claim 13, wherein lengthwise axes of the optoelectronic linear sensors enclose a polygonal shape that is free of right angled corners.

15. Apparatus in accordance with claim 14, wherein the polygonal shape is essentially an equilateral triangle.

16. Apparatus in accordance with claim 12, wherein the optoelectronic linear sensors are arranged in an annular manner in which each optoelectronic linear sensor overlaps adjoining optoelectronic linear sensors.

17. Process for qualitative or quantitative determination of the three-dimensional location of two bodies relative to one another in at least one of translational and angular coordinate systems, comprising the steps of:
mounting a transmitting device, which emits a light beam which is flared in at least three planes, on a first of the two bodies facing toward a second of the two bodies;
mounting a receiving device on the second of the two bodies facing toward the first of the two bodies, the receiving device having at least two linear optoelectronic sensors which are arranged in an annular manner in which each optoelectronic linear sensor overlaps adjoining optoelectronic linear sensors with the overlapped sensors together producing a gap-free measurement range;
emitting a light beam which is flared in at least three intersecting planes and directing it toward the receiving device;
determining incidence points of the light beam which has been flared in at least two planes on the optoelectronic linear sensors; and
using the determination of the incidence points for qualitative or quantitative determination of the three-dimensional location of two bodies relative to one another.

* * * * *